United States Patent
Ko et al.

(10) Patent No.: US 6,566,480 B2
(45) Date of Patent: May 20, 2003

(54) MULTI-REACTIVE POLYSILOXANE COMPOUND HAVING HALOGEN SUBSTITUENTS AND SYNTHETIC METHOD THEREOF

(75) Inventors: Young-Hoon Ko, Taejeon (KR); Eun-Kyoung Kim, Taejeon (KR); Hyoung-Suk Cho, Taejeon (KR)

(73) Assignees: Korea Kumho Petrochemical Co., Ltd., Seoul (KR); Korea Research Institute of Chemical Technology, Taejeon (KR)

( * ) Notice: Subject to any disclaimer, the term of this patent is extended or adjusted under 35 U.S.C. 154(b) by 0 days.

(21) Appl. No.: 09/815,847

(22) Filed: Mar. 23, 2001

(65) Prior Publication Data

US 2002/0002264 A1 Jan. 3, 2002

(30) Foreign Application Priority Data

May 17, 2000 (KR) ........................ 2000-26323

(51) Int. Cl.$^7$ ................................ C08G 77/24
(52) U.S. Cl. .................. 528/42; 525/100; 525/105
(58) Field of Search ................... 528/42, 31, 15; 525/100, 102, 105

(56) References Cited

U.S. PATENT DOCUMENTS

| | | | |
|---|---|---|---|
| 2,823,218 A | * | 2/1958 | Speier et al. .............. 252/573 |
| 4,079,098 A | * | 3/1978 | Rossmy et al. ............ 525/102 |
| 4,160,775 A | * | 7/1979 | Schilling, Jr. .............. 556/416 |
| 4,599,394 A | | 7/1986 | Lucas |
| 4,657,989 A | * | 4/1987 | Evans ......................... 525/464 |
| 4,731,411 A | | 3/1988 | Lucas |
| 4,978,720 A | | 12/1990 | Cozewith et al. |
| 5,194,553 A | | 3/1993 | Freeburne et al. |
| 5,296,574 A | | 3/1994 | Hoxmeier |
| 5,340,899 A | | 8/1994 | Altes |
| 5,373,079 A | | 12/1994 | Altes |
| 6,121,368 A | * | 9/2000 | Heying et al. .............. 524/266 |
| 6,356,672 B1 | * | 3/2002 | Feng et al. ................. 358/520 |

FOREIGN PATENT DOCUMENTS

| | | | | |
|---|---|---|---|---|
| JP | 71009355 B | * | 9/1971 | ........... C08D/00/00 |
| KR | 95704405 | | 11/1995 | |
| KR | 96008120 | | 1/1999 | |

\* cited by examiner

*Primary Examiner*—Robert Dawson
*Assistant Examiner*—Marc S Zimmer
(74) *Attorney, Agent, or Firm*—Davidson, Davidson & Kappel, LLC

(57) ABSTRACT

A halogen-substituted reactive polysiloxane compound has a number average molecular weight of 400 to 100,000 and is represented by the formula $Y-\{C(R^3)(R^4)\}_c-CH_2CH_2-Si(R^1)(R^2)-\{O-Si(R^1)(R^2)\}_d-CH_2CH_2-\{C(R^3)(R^4)\}_c-Y$, in which Y is $(X)_a(R)_b Si$ or $(X)_c(R^1)_f-Bz-C(R^5)_i(X)_j$; X is a halogen atom selected from F, Cl, Br and I; R is an alkyl group from $C_1$ to $C_{20}$ including methyl, ethyl or propyl; $R^1$, $R^3$, $R^4$ and $R^5$ are a hydrogen, an alkyl group from $C_1$ to $C_{20}$ including methyl, ethyl or propyl, or a halogen-substituted alkyl or silane group; $R^2$ is defined as $R^1$, or $(X)_g(R^3)_h C-\{C(R^3)(R^4)\}_c$; a is an integer from 1 to 3, and b is an integer from 0 to 2, wherein a+b=3; c is an integer from 0 to 1000; d is an integer from 1 to 50000; e and f are independently an integer from 0 to 4, wherein e+f=4; g and h are independently an integer from 0 to 3, wherein g+h=3; i and j are independently an integer from 0 to 3, wherein i+j=3; and Bz is a benzene ring.

1 Claim, No Drawings

MULTI-REACTIVE POLYSILOXANE COMPOUND HAVING HALOGEN SUBSTITUENTS AND SYNTHETIC METHOD THEREOF

BACKGROUND OF THE INVENTION

1. Field of the Invention

The present invention relates to a multi-reactive polysiloxane compound having at least two halogen substituents and a synthetic method thereof and, more particularly, to a reactive siloxane compound and a synthetic method thereof in which the polysiloxane compound has at least two halogen substituents highly reactive to anion of living polymers such that addition of the polysiloxane compound in an anion polymerization reaction may enhance the heat resistance and abrasion resistance of the polymer, with improved compatibility with inorganic fillers and reinforcements used in rubber compositions and provide elastomers modified with organic silicon.

2. Description of the Related Art

Elastomers are excellent in readiness of synthesis and mechanical properties, including elasticity, and broadly used in various applications such as tires, parts of motorcar, impact absorbents, shoes and packing. Such elastomers have been developed for organic-inorganic composite materials, which are synthesized by mixing silica and glass fibers in vulcanization in order to provide enhanced heat resistance and strength.

Korean Patent Publication No. 96-008120, for example, discloses a styrene resin composition comprising 0.3 to 1.0 part by weight of polysiloxane, and glass fiber in addition to 100 parts by weight of a styrene resin composed of 20 to 70 parts by weight of amorphous polystyrene resin and 80 to 30 parts by weight of rubber-modified styrene resin. However, such an organic polymeric composite material, which is prepared by dispersion of polydimethylsiloxane, is susceptible to phase separation and incompatible with inorganic fillers due to no chemical bond between polydimethylsiloxane and organic polymer. Therefore, the composite material is hard to have the properties enhanced.

To solve the problem with the composite material in regard to compatibility of the polymer with inorganic fillers and siloxane, many studies have been made on those polymers that have siloxane substituents. For example, Korean Patent Laid-open No. 95-704405 discloses a method of adding hexamethylchlorotrisiloxane to the living group terminal of the polymer. This method may overcome the problem of phase separation but involve another problem that the polymer can not have higher molecular weight and enoughly enhance physical property from the existence of the siloxane substituents.

Therefore, there is a need of developing a highly reactive polysiloxane compound.

Polysiloxane with terminal or side reactive substituents is commonly added to coating, coupling agent, adhesive, sticking agent and sealant in order to enhance the mechanical properties of the coating surface against the medium, heat resistance, and compatibility. U.S. Pat. No. 5,858,468, for instance, discloses a composition comprising a polysiloxane having unsaturated groups and another polysiloxane having a Si—H groups, which coating composition cures at room temperature. U.S. Pat. No. 5,373,079 refers to a polydimethylsiloxane having alkoxy, acyloxy, N-methylbenzamido, or alkyl substituents. In U.S. Pat. No. 5,340,899, disclosed is a mixture that contains a polysiloxane having terminal hydroxyl groups and a silane having vinyl or methylacetamido groups, thereby effectively reducing the modulus of siloxane sealants. In addition, U.S. Pat. No. 5,194,553 describes an organofunctionl-terminated polydiorganosiloxane polymer and a preparation method for a copolymer thereof, which are specifically useful in preparation of 5-hexenyl-terminated polydimethylsiloxanes. The methods as stated in the cited reference include a method for preparing an organofunctionl-terminated polydiorganosiloxane polymer using an organofunctional chlorosilane end-blocker, and a method for preparing an organofunctionl-terminated polydiorganosiloxane copolymer using an organofunctional chlorosilane end-blocker and an organofunctional dichlorosilane. The organofunctionl-terminated polydiorganosiloxane polymer has the formula $R^1{}_aR_bSiO(R^2SiO)_xSiR^1{}_aR_b$, in which R is alkyl or aryl; $R^1$ and $R^2$ are independently alkenyl or haloalkyl; and a and b are integers satisfying the relationship a+b=3; and the organofunctional-terminated polydiorganosiloxane copolymer has the formula

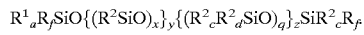

The reactive siloxane or silane can also be substituted to the terminal or block of the polymer in order to enhance the mechanical properties and characteristics of the polymer. For example, a polymer substituted functional groups such as an olefinic chlorosilane and olefinic halide is described in U.S. Pat. No. 4,978,720, which polymer can be copolymerized with ethylene and alpha-olefinic monomers to form a modified polyolefin. In addition, Lucas in U.S. Pat. Nos. 4,599,394 (filed on Jul. 8, 1986) and 4,731,411 (filed on May 15, 1988) has reported a method for preparing a polysiloxane having terminal alkoxyl substituents, which polysiloxane is usable for a silicon rubber composition readily vulcanized at room temperature. Such a reactive polysiloxane, with at least two substituents, is reactive to at least two living groups of a polymer to form multi-substituted elastomers.

However, the polydimethylsiloxane is readily decomposed prior to reaction with the living groups of the polymer due to its low storage stability or not so reactive to anion of living polymers to participate in the multi-substitution.

Accordingly, there is a need for multi-reactive polysiloxanes containing polysiloxane groups and reactive to anion of living polymers.

SUMMARY OF THE INVENTION

In an attempt to solve the problems, the present inventors have studied on a method for preparing a polysiloxane macromer containing reactive groups and, particularly, a method for preparing a polysiloxane having at least two halogen substituents for multi-substitution.

It is, therefore, an objective of the present invention to provide a new halogen or alkyl-substituted reactive polysiloxane that is reactive to at least one equivalent of a polymer in an anionic polymerization reaction.

To achieve the above objective of the present invention, there is provided a halogen-substituted reactive polysiloxane compound with a number average molecular weight of 400 to 100,000 and the following formula 1, $Y-\{C(R^3)(R^4)\}_c-CH_2CH_2-Si(R^1)(R^2)-\{O-Si(R^1)(R^2)\}_d-CH_2CH_2-\{C(R^3)(R^4)\}_c-Y$, in which Y is $(X)_a(R^1)_bSi-$, or $(X)_e(R^1)_f-Bz-C(R^5)_i(X)_j-$; X is a halogen selected from F, Cl, Br and I; R is an alkyl group from $C_1$ to $C_{20}$ including methyl, ethyl or propyl; $R^1$, $R^3$, $R^4$ and $R^5$ are a hydrogen, an alkyl group from $C_1$ to $C_{20}$ including methyl, ethyl or propyl, or a halogen-substituted alkyl or silane group; $R^2$ as defined as $R^1$, or $(X)_a(R^3)_bC-\{C(R^3)(R^4)\}_c-$; a is an integer from 1 to 3, and b is an integer from 0 to 2, wherein a+b=3; c is an integer from 0 to 1000; d is an integer from 1 to 50000; e and f are independently an integer from 0 to 4, wherein e+f=4; g and h are independently an integer from 0 to 3, wherein g+h=3; i and j are independently an integer from 0 to 3, wherein i+j=3; and Bz is a benzene ring.

The reactive polysiloxane compound of formula 1 is prepared by reacting a halogen-substituted vinyl compound represented by the following formula 2, $Y-\{C(R^3)(R^4)\}_c-CH=CH_2$, in which Y, X, R, $R^1$, $R^3$, $R^4$, $R^5$, and a to c and e, f, i and j are as defined as in formula 1, with a compound having H—Si group represented by the following formula 3, $H-Si(R^1)(R^2)-\{O-Si(R^1)(R^2)\}_d-H$, in which X, $R^1$, $R^2$, $R^3$, $R^4$, and c, d, g and h are as defined as in formula 1.

The present invention also provides a polysiloxane-substituted polymer containing at least 2 equivalents of a diene copolymer per a polysiloxane unit and having a number average molecular weight of 1,000 to 5,000,000, the polysiloxane-substituted polymer being prepared by reacting a living polymeric group of the diene copolymer with a reactive polysiloxane compound represented by formula 1.

DETAILED DESCRIPTION OF THE PREFERRED EMBODIMENT

Hereinafter, preferred embodiments of the present invention will be described in detail as follows.

The reactive polysiloxane having at least two halogen substituents as represented by formula 1 is prepared by reacting a vinyl or silicon compound having at least one halogen substituent as represented by formula 2 with a polysiloxane as represented by the formula 3 in the presence of a hydrosilylation catalyst.

Specific examples of the compound of formula 2 include trichlorovinyl silane, dichloromethylvinyl silane, chlorodimethylvinyl silane, and 4-trifluoromethyl styrene. Specific examples of the compound of formula 3 include a hydrogen-terminated polydimethyl siloxane. These compounds are synthesized by industrial method or commercially available from a manufacturing company such as Aldrich.

Examples of the hydrosilylation catalyst include chloroplatinic acid, transition metal selected from palladium, rhodium and platinum, and complex compounds, which are all commercially available from the manufacturing company such as Aldrich.

Examples of the reaction solvent as used herein may include, if not specifically limited to, organic solvents such as benzene and toluene.

The hydrosilylation temperature is in the range from –20° C. to 150° C., preferably, from room temperature to 120° C. The hydrosilylation is conducted in the nitrogen atmosphere while stirring. The hydrosilylation time is not specifically limited and may be preferably in the range from about 30 minutes to one week.

After the completion of the reaction and removal of the solvent, the resulting material is purified to obtain the polysiloxane having at least two halogen substituents as represented by formula 1.

The polysiloxane of formula 1 according to the present invention has halogen groups highly reactive to anion of living polymers to form a covalent bond between the polymer and polysiloxane, and thus can be used in the preparation of a polysiloxane-modified polymer. Also, the polysiloxane block enhances compatibility with inorganic fillers such as silica, carbon black, metal oxides, metal powder, glass fiber, and other ceramics, and can be used for organic-inorganic hybrid composite materials.

In particular, the polysiloxane of the present invention is very soluble in normal organic solvents such as benzene, toluene, xylene, acetonitrile, sulfolane, propylene carbonate and acetone, and highly reactive to anion of living polymers generated by anionic initiators. The polymeric ions may include reaction products comprising monomers such as aromatic or aliphatic diene with unsaturated groups, or polysiloxane or cyclosiloxane.

Therefore, the polysiloxane prepared according to the present invention and an elastomer composition including the polysiloxane can be used for preparation of modified polymers, which is usable for compositions of various use purposes, such as conductive rubber, tire, adhesive, sticking agent, coating solution, sealant, and paint.

Hereinafter, the present invention will be described in detail by way of examples, which are not intended to limit the scope of the present invention.

EXAMPLE 1

Synthesis of Polysiloxane Having Two Terminal Trichlorosilane Substituents 25 g of the hydride-terminated siloxane [H-$\{Si(Me)_2-O\}_{13}Si(Me)_2$—H] prepared by a known method under the nitrogen atmosphere was dissolved in 150 ml of toluene, followed by adding 0.1 ml of platinum (0)1,3-divinyl-1,1,3,3-tetramethyldisiloxane complex dissolved in xylene as a catalyst and 7.6 ml of trichlorovinyl silane, and 24 hours of stirring at 60° C.

After the completion of the reaction and removal of the solvent under vacuum, the product was dissolved in n-hexane in the argon(Ar) atmosphere and passed through charcoal. The n-hexane and the remaining trichlorovinyl silane were removed under vacuum to obtain a polysiloxane having two terminal trichlorosilane substituents [$Cl_3SiCH_2CH_2-\{Si(Me)_2-O\}_{13}Si(Me)_2-CH_2CH_2SiCl_3$] with 95% yield.

$^1$H-NMR (ppm) 0.01~0.2, 0.4, 1.2. IR (cm$^{-1}$) 1030~1090 (Si—O—Si), 1260 (Si—CH$_2$), 802 (Si—Cl).

EXAMPLE 2

Synthesis of Polysiloxane Having Two Terminal Trichlorosilane Substituents

As shown in Table 1, the procedures were performed in the same manner as described in Example 1, excepting that 12 g of H—$\{Si(Me)_2-O\}_7Si(Me)_2$—H was used instead of H—$\{Si(Me)_2-O\}_{13}Si(Me)_2$—H to obtain a polysiloxane having two terminal trichlorosilane substituents [$Cl_3SiCH_2CH_2-\{Si(Me)_2-O\}_7Si(Me)_2-CH_2CH_2SiCl_3$] with 95% yield.

$^1$H-NMR (ppm) 0.01~0.2, 0.4, 1.2. IR (cm$^{-1}$) 1030~1090 (Si—O—Si), 1260 (Si—CH$_2$), 802 (Si—Cl).

EXAMPLE 3

Synthesis of Polysiloxane Having Two Terminal Dichloromethylsilane Substituents

As shown in Table 1, the procedures were performed in the same manner as described in Example 1, excepting that dichloromethylvinylsilane was used instead of trichlorovinylsilane to obtain a polysiloxane having two terminal dichloromethylsilane substituents [CH$_3$Cl$_2$SiCH$_2$CH$_2$—{Si(Me)$_2$—O}$_7$Si(Me)$_2$—CH$_2$CH$_2$SiCl$_2$CH$_3$], with 95% yield.

IR (cm$^{-1}$) 1030~1090 (Si—O—Si), 1260 (Si—CH$_2$), 802 (Si—Cl).

EXAMPLE 4

Synthesis of Polysiloxane Having Two Terminal Fluorophenyl Substituents

As shown in Table 1, a hydride-terminated polysiloxane was reacted with 4-trifluoromethylstyrene, after which the product thus obtained was purified to yield a polysiloxane having two terminal fluorophenyl substituents with more than 90% yield.

TABLE 1

| Example | Compound of Formula III (unit: g) | Compound of Formula II (unit: g) | Solvent | Temp. (° C.) | Time (hr) | Yield (g) |
|---|---|---|---|---|---|---|
| 3 | [H—{Si(Me)$_2$—O}$_7$Si(Me)$_2$—H] (12) | Trichlorovinyl silane (7.3) | Toluene | 60 | 12 | 16 |
| 4 | [H—{Si(Me)$_2$—O}$_{13}$Si(Me)$_2$—H] (1.02) | Dichloromethyl vinyl silane (0.42) | Benzene | 60 | 5 | 1.2 |
| 6 | [H—{Si(Me)$_2$—O}$_{13}$Si(Me)$_2$—H] (5.12) | 4-trifluoromethyl styrene (3.4) | Toluene | Reflux | 12 | 7 |

EXAMPLE 5

Synthesis of Polystyrene-Butadiene-Polysiloxane Having at Least Four Polystyrene-Butadiene Polymeric Substituents to the Ends Of polysiloxane To a 10 l autoclave reactor were added 5000 g of cyclohexane, 100 g of tetrahydrofuran, 200 g of styrene monomer, 800 g of butadiene monomer and then 10 mmol of n-butyl lithium were introduced to start an anionic polymerization. Following 1 hr of the polymerization reaction, 1.4 g of the polysiloxane compound obtained in Example 1 was added to the reaction mixture, thereby coupling the ends of the polymer. After 10 minutes, 5 ml of a methanol solution (1M cyclohexane solution) was added to the reaction mixture to deactivate the residual living terminal of the polymer.

The final product thus obtained was a styrene-butadiene random copolymer of which the bonded styrene content was 20%, the 1,2-vinyl bond content of the butadiene unit 57%, the coupling number (C/N) 4.5, the number average molecular weight about 310,000.

EXAMPLE 6

Synthesis of Polystyrene-Butadiene-Polysiloxane Having at Least Four Polystyrene-Butadiene Polymeric Substituents to the Ends Of Polysiloxane To a 10 l autoclave reactor were added 5000 g of cyclohexane, 100 g of tetrahydrofuran, 200 g of styrene monomer, 800 g of butadiene monomer and 10 mmol of n-butyl lithium. Following the polymerization reaction, 0.9 g of the polysiloxane compound obtained in Example 3 was added to the reaction mixture, thereby coupling the ends of the polymer. After 10 minutes, 5 ml of a methanol solution (1M cyclohexane solution) were added to the reaction mixture to deactivate the residual living terminal of the polymer.

The final product thus obtained was a styrene-butadiene random copolymer of which the bonded styrene content was 20%, the 1,2-vinyl bond content of the butadiene unit 57%, the coupling number (C/N) 4.4, the number average molecular weight about 300,000.

EXAMPLE 7

Synthesis of Polystyrene-Butadiene-Polysiloxane Having at Least Four Polystyrene-Butadiene Polymeric Substituents to the Ends Of Polysiloxane To a 10 l autoclave reactor were added 5000 g of cyclohexane, 100 g of tetrahydrofuran, 200 g of styrene monomer, 800 g of butadiene monomer and 10 mmol of n-butyl lithium. Following the polymerization reaction, 1.3 g of the polysiloxane compound obtained in Example 4 was added to the reaction mixture, thereby coupling the ends of the polymer. After 10 minutes, 5 ml of a methanol solution (1M cyclohexane solution) were added to the reaction mixture to deactivate the residual living terminal of the polymer.

The final product thus obtained was a styrene-butadiene random copolymer of which the bonded styrene content was 20%, the 1,2-vinyl bond content of the butadiene unit 57%, the coupling number (C/N) 4, the number average molecular weight about 280,000.

What is claimed is:

1. A polysiloxane-substituted polymer containing at least 2 equivalents of a diene copolymer per a polysiloxane unit and having a number average molecular weight of 1,000 to 5,000,000, the polysiloxane-substituted polymer being prepared by reacting a living polymeric group of the diene copolymer with a reactive polysiloxane compound represented by the formula Y—{C(R$^3$)(R$^4$)}$_c$—CH$_2$CH$_2$—Si(R$^1$)(R$^2$)—{O—Si(R$^1$)(R$^2$)}$_d$—CH$_2$CH$_2$—C(R$^3$)(R$^4$)}$_c$—Y in which Y is (X)$_a$(R)$_b$Si, (X)$_a$(R)$_b$C, or (X)$_e$(R$^1$)$_f$—Bz—C(R$^5$)$_i$(X)$_j$;

X is a halogen atom selected from F, Cl, Br and I;

R is a hydrogen or an alkyl group from C$_1$ to C$_{20}$ including methyl, ethyl or propyl;

R$^1$, R$^3$, R$^4$ and R$^5$ are defined as R, or a halogen-substituted alkyl or silane group; R$^2$ is defined as X or R$^1$, or (X)$_g$(R$^3$)$_h$C—{C(R$^3$)(R$^4$)}$_c$;

a is an integer from 1 to 3, and b is an integer from 0 to 2, wherein a+b=3; c is an integer from 0 to 1000; d is an integer from 1 to 50000;

e and f are independently an integer from 0 to 4, wherein e+f=4;

g and h are independently an integer from 0 to 3, wherein g+h=3;

i and j are independently an integer from 0 to 3, wherein i+j=3;

and Bz is a benzene ring.

* * * * *